May 19, 1970          E. CAJA          3,512,431

AUTOMATIC MACHINING PROCESS FOR BLANKING DIES

Original Filed March 11, 1966

INVENTOR.
EMILIO CAJA

BY

ATTORNEYS

United States Patent Office 3,512,431
Patented May 19, 1970

---

3,512,431
AUTOMATIC MACHINING PROCESS FOR BLANKING DIES
Emilio Caja, Ivrea, Torino, Italy, assignor to Ing. C. Olivetti & C., S.p.A., Ivrea, Italy, a corporation of Italy
Continuation of application Ser. No. 533,613, Mar. 11, 1966. This application Nov. 20, 1968, Ser. No. 778,031
Claims priority, application Italy, Mar. 13, 1965, 5,993/65
Int. Cl. B21k 5/20
U.S. Cl. 76—107                                       5 Claims

ABSTRACT OF THE DISCLOSURE

An automatic machining process for blanking dies, consisting of at least two parts such as a punch and a matrix having complementary blanking profiles comprising for each one of the parts the operation of milling a blanking profile and a reference profile, heat treating said part, and grinding said blanking profile, said reference profile being used to position said part with respect to the grinding tool.

---

Figure 2:
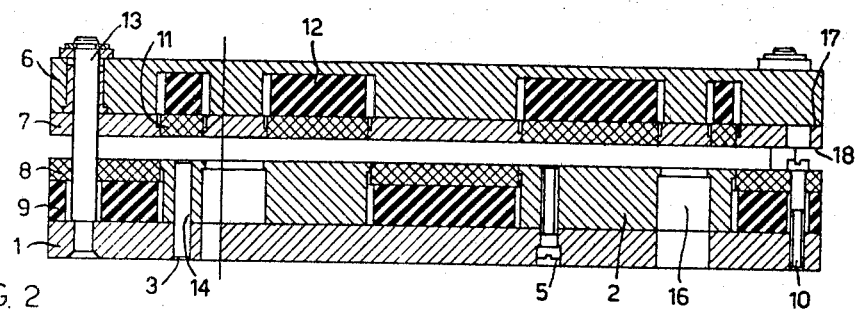

This application is a continuation of copending application Ser. No. 533,613 filed Mar. 11, 1966, now abandoned.

This invention relates to an automatic machining process for blanking dies which comprise at least two parts (punch and matrix) having complementary blanking profiles.

A working process, already in use, comprises: the milling of a matrix by means of machine tools controlled by an operator, according to a drawing or a model; the heat treating of the die surface; the manual grinding of the matrix; the rough tooling of a punch; the marking of the blanking profile on the rough punch by pressing it against the die; the slotting of the punch; the heat treating of the punch surface; and the manual grinding of the punch.

It is clear that in this as in other known analogous processes the proper precision of the matrix and punch profiles, as well as the accuracy of positioning of the same profile with respect to the reference surfaces of the matrix and punch support plates, and especially the coupling accuracy for the matrix and punch complementary profiles, are obtained by means of long and costly manual operations consisting of successive approximations.

Besides the disadvantage of the high cost resulting from the long time required to carry out the process and from the need to have skilled operators available, the above mentioned known methods have the disadvantage of requiring an almost complete repetition of all the working operations if the same die should be modified or reproduced, and of permitting no simplification in the production of dies having profiles partly similar to others which are already made.

Some of the above mentioned disadvantages are avoidable by forming the dies from a number of simple pieces which can therefore be more easily machined. However this last mentioned process considerably increases the die cost, partly because of the complexity of the operations to couple together the various pieces obtained and also because of the delicate nature of these operations.

Moreover, for the purpose of avoiding the above mentioned disadvantages, it has been proposed to form the die profiles by means of automatically controlled machine tools. in which the path of the tool is continuously controlled by a recorded program. The availability of the program, recorded e.g. on a tape, obviously simplifies the entire or partial reproduction of the dies.

However, manufacture by means of automatically controlled machine tools has so far been restricted to the drawing dies which do not require a high degree of precision in the coupling together of the profiles of the two parts (matrix and punch) or in the surface finish of these parts, and in which, furthermore, there are neither problems of accurately coupling together the different pieces constituting a particular part, nor problems of forming therethrough holes corresponding to the voids in the blanking profile.

One object of this invention is to permit the automatic machining of blanking dies, thereby avoiding the long and costly manual operations of finishing and assembly.

Another object of this invention is to permit the automatic manufacture of dies, including the finishing of the dies, in spite of the deformations formed in the die parts during the heat treating process which is performed after the milling of the blanking profiles and before the finishing of the dies.

A further object of this invention is to permit numerically controlled automatic manufacture of the different parts of a die under the control essentially of a single symbolic program.

The aforesaid disadvantages are obviated and the aforesaid objects are achieved by the process according to the invention, the process comprising for each one of said parts the following operations: the milling of said blanking profile by means of a machine tool in which the path of the tool is continuously controlled by a recorded program and the milling of a reference profile in said part; the heat treating of said part so milled; and the grinding of said blanking profile by means of a machine tool in which the path of the grinding tool is continuously controlled by a recorded program, said reference profile being used to position said part with respect to said grinding tool.

Figure 1:
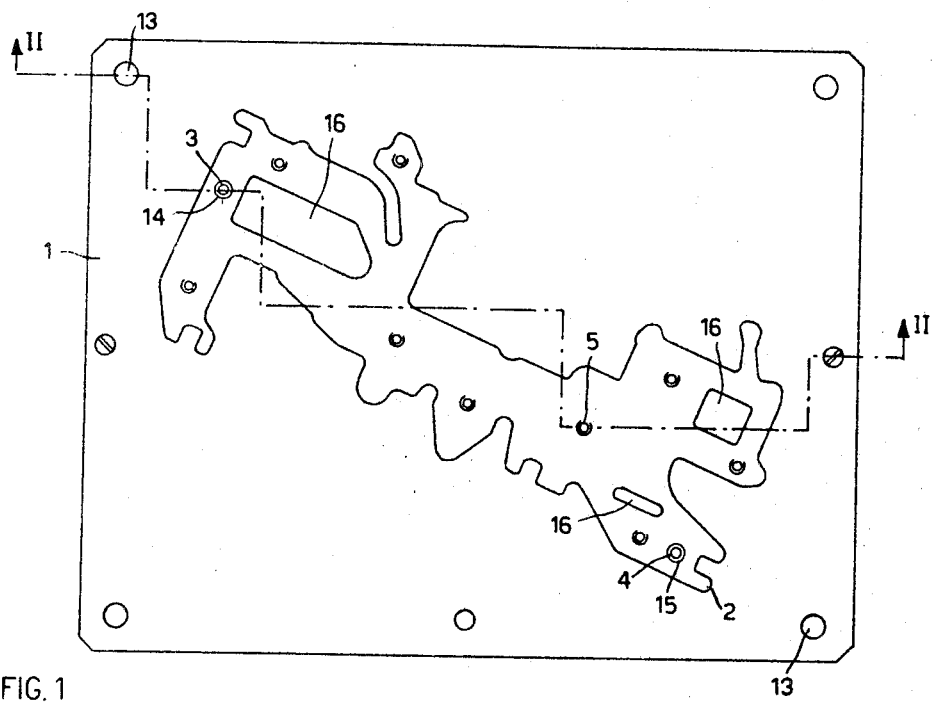
Figure 3:
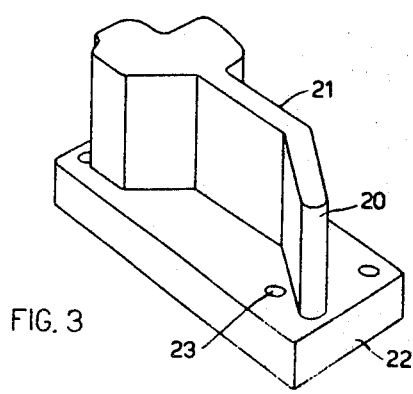

These and other features of the invention will clearly appear from the following description of a preferred embodiment thereof, the embodiment being described, by way of example and not for purposes of limitation, with reference to the annexed drawings in which:

FIG. 1 shows a top view of a blanking punch.
FIG. 2 shows a vertical section, along the line II—II, of the punch of FIG. 1 and shown in the matrix and other elements of the die to which said punch relates.
FIG. 3 shows a perspective view of a male part constituting a portion of a matrix as shown in FIG. 2.

According to the embodiment illustrated in FIGS. 1 and 2, the die comprises a lower mounting plate 1 adapted to support a punch 2 which is fixed to the plate 1 by means of dowel pins 3 and 4 and securing screws 5; an upper mounting plate 6 adapted to support a matrix 7 which is likewise fixed to the plate 6 by means of dowel pins and securing screws; a sheet stripper 8 cut according to a profile which is complementary to the punch profile and which, by way of an elastic element 9 formed e.g. of rubber, rests on the lower mounting plate 1, the stripper 8 being maintained a pre-determined distance from the plate 1 by means of screws 10; and a part presser 11 which, by way of an elastic element 12 formed e.g. of rubber, rests on the upper mounting plate 6. The four above mentioned plates are mounted on vertical guides 13 which precisely determine their mutual horizontal positions.

A die of the type illustrated in the FIGS. 1 and 2 is recessed according to the following process. The milling of the different parts of the die is performed primarily by means of a milling machine provided with an automatic control device, the path of the tool being continuously controlled by a program recorded in digital form on a tape. A digital control device of this type is described e.g. in the applicant's French Pat. No. 1,423,743 filed by the applicant on Oct. 2, 1964 and in the U.S.

patent application Ser. No. 444,207 filed by the applicant on Mar. 31, 1965.

The preparation of the control tape, on which the numerical program is recorded, comprises the following operations:

(A) Preparation, by a programmer, of a symbolic program according to the drawing or the model of the piece to be formed, the symbolic program containing: (a) the geometric definition of the profile to be milled. More particularly the definition of the coordinates of points lying on the profile and the definition of the rectilinear segments or of the arcs of a circle or of the segments of more complex lines which connect said points, and (b) the definition of the technological production data, e.g. the type and the dimensions of the tool and the feeding speed for each section of the profile to be milled, the thickness of the excess metal to be left in each section, the advance and return movements of the tool with respect to the profile to be milled, the intermediate stopping points during the milling of the profile, the speed of the tool holder chuck, etc.;

(B) Recording of the above mentioned geometric and technological data, which in total constitute the symbolic program, on a support adapted to feed an electronic computer;

(C) Computation, by means of the electronic computer, of the path which the center of the tool is required to follow in order to mill said profile, taking into account the determined technological data; eventual successive processing of the data in a post-processor functioning essentially as a numerical interpolator, and recording on the control tape of the coordinates of the successive points of said computed path, in a form adapted to feed said automatic control device of the machine tool.

Thus it is clear that human intervention is essentially limited to operations (A) and (B) concerning the preparation and the recording of the symbolic program, while operation (C), concerning the translation of the symbolic program into a numerical program, is automatically executed by the electronic computers.

The control device of the machine tool is furthermore provided with a correcting device e.g. of the type described in the U.S. Pat. No. 3,103,614 for compensating the tool radius variations. By virtue of said correcting device, the machine tool, which is controlled by a tape carrying the numerical program for milling a certain profile by means of a tool having a radius R, is enabled to mill the same profile even if it has a radius $r$, provided that on a setting device of said correcting device the value of the compensation ration $R/r$ has been previously set up. On the other hand, by controlling the machine tool with the same tape and using the same tool of radius R, said setting device being on a first occasion set up for the ratio $R/r'$ and being set up on a second occasion for the ratio $r/R$, two similar profiles, spaced apart by the difference $r'-r$, will be milled.

The control device of the machine tool is furthermore provided with means for producing the mirror image of the profile, said means being adapted to condition the control device for interpreting all the coordinates, which are recorded on the program tape and are related to a certain machine axis X, as having the opposite algebraic sign to that recorded on the tape so that by operating a commutator it is possible to control, by means of a single program both the milling of a first profile and the milling of a second profile which is the mirror image of the first profile with respect to the other axis X.

The finishing of the different parts of the die is performed by a grinding machine provided with an analogous automatic control device fed by a recorded program.

For machining the punch in the piece from which it is to be formed, two reference holes are machined therethrough using a drilling/boring machine.

The piece is then mounted on the worktable of the above mentioned numerically controlled milling machine, said reference holes being engaged by two corresponding reference dowel pins which are carried by a work holding fixture attached to said table. After starting the automatic operation of the milling machine, the punch profile is milled on the punch lower face under the control of the program tape. The profile to be milled on said lower face differs from the blanking profile since the dimensions of the voids should be slightly greater than in the blanking profile, as indicated in FIG. 2. However in this operation it is possible to control the machine tool with the same program tape as is used for milling the blanking profile, by using a tool having a greater radius or by using said tool radius compensating device, and by also using said reversing means for producing a mirror image of the profile.

After the piece has been inverted and positioned in such manner that the same reference holes 14 and 15 are again engaged by the same dowel pins carried by the work holding fixture which is fixed to the worktable, the blanking profile is milled on the other face of the piece under the control of said program tape. In said operation the correcting device for compensating the tool radius variations is used for obtaining on the blanking profile an excess of metal of the proper thickness. This excess of metal is removed during the subsequent grinding operation.

The piece is then removed and heat treated to obtain the necessary surface hardness.

After said heat treatment the piece is mounted on the table of said numerically controlled grinding machine, the two reference holes of the piece being engaged by the two corresponding reference dowel pins of a work holder fixture fixed to the worktable of the grinding machine.

During the deformation caused by the heat treatments the distance between the centers of the reference holes and their relative positions wtih respect to the blanking profile may alter. In order to position the piece correctly in spite of said deformation, it is convenient to use two dowel pins of the two-diameter type, these dowel pins being selected by the operator from a series of dowels each of which has the lower end provided with a diameter of the lower end of the other dowels. The operator selects from said series of dowels two dowels the diameters of the upper ends of which are such as to compensate for the effect of said variation in the distance between the centers of the reference holes.

If it is considered necessary, the profile is then examined by means of a microscope carried by the chuck of the grinding machine and displaced under the control of the program tape, in order to ascertain that, in spite of the deformations produced by the heat treatment and the errors in the positioning of the piece, an excess of metal, sufficient for the grinding operation, has been left around the entire profile, said positioning then being corrected if necessary.

After having fixed the piece by means of brackets and after having removed the dowel pins, the reference holes 14 and 15 are re-formed. During this operation, since the motion of the tool is controlled by the program tape, both the distance between the centers, and the diameter, of the reference holes are, except for the negligible error due to the machine tool, accurately corrected.

The blanking profile is then ground, possibly after re-insertion of the dowel pins to ensure greater accuracy in the position of the piece, the tool feed being controlled by the program tape.

During this operation it is possible to use the same cylindrical or conical grinding wheel both for grinding the blanking profile and for grinding the reference holes, this last named operation being executed in a known manner by means of an attachment for causing planetary movement of the chuck. It is to be noted that the use of a position control system of the type described in the above mentioned U.S. patent application Ser. No. 444,207 permits the positioning of the tool in a simple and accurate manner with respect to the theoretical centers of the holes, since said centers can be arranged to coincide with one of the zero positions of the position measuring transformer with which the servomechanism of the machine tool is provided. In fact, as described in the above mentioned U.S. patent application Ser. No. 444,207 after the manual coarse positioning of the tool with respect to one of said centers, the fine positioning is performed merely by operating a push-button which closes the loop of the servosystem, this latter being simultaneously fed with a zero position order.

The machining process for the matrix is analogous to that for the punch. The matrix 7, as shown in FIG. 2, comprises internal punches corresponding to the voids 16 of the punch 2. Said internal punches and the remaining part of the matrix can be properly formed by milling one piece. More particularly, after having milled the profile on the face 17 of the martix 7, the parts of said piece which will form said internal punches are attached to the upper plate 6 by reference dowel pins and by securing screws. After having milled the blanking profile on the face 18 of the matrix, in such a way as to isolate said internal punches, the last mentioned internal punches and the remaining part of the matrix are then removed to be hardened. Each part constituting the matrix is then remounted to its position, before the numerically controlled grinding operation, by using the respective dowel pins to obtain correct relative positioning. Thus it is clear that a matrix formed from a single piece, i.e. without internal punches, can, in spite of its mounting plate 6, be produced as previously described for the punch, while to produce a matrix formed of more pieces it is possible to use the relevant mounting plate 6 for solidly securing said pieces together during the manufacture.

It is clear that, by means of the same numerical program tape, as is used to control the milling of the punch 2, it is possible to control the milling of the part presser 11, either a tool having a different diameter or a correcting device, compensating for the tool radius variations, being employed to obtain the necessary free play between the two complementary profiles. In an analogous manner the same program tape can be used to mill the matrix 7 and the sheet stripper 8.

The machining of the entire die requires, therefore, four program tapes for the milling and the grinding of the punch and for the milling and the grinding of the matrix. However said tapes are automatically produced by the computer starting from a single symbolic program, so that the cost and the time for programming are considerably reduced. Besides, if the same tool feeding speed is used both in the milling and in the grinding, only two tapes are necessary, one for the matrix and another for the punch, the symbolic program needed for preparing said two tapes being substantially the same since it is sufficient in both cases to alter merely the few technogical data defining the sign of the difference of the tool positions with respect to the theoretical profile in both cases, and the paths for the initial advance and the final return of the tool with respect to the same profile.

The process according to the invention also permits considerable simplifications and improvements in the machining of dies from blank pieces formed from a previously drawn sheet. To define the blanking profile in this case, it is known that it is necessary to carry out successive drawing tests on the piece, in order to determine "a posteriori" and by means of successive approximations the effect of the drawing deformations on the blanking profile. As, in the process according to the invention, the blanking profile is determined by the programmer only through a symbolic program containing the coordinates of few critical points of the profile, it is possible to eliminate the long manual operations of measuring the dimensions and effecting successive comparisons with the blanking die being formed.

In the case in which the male parts of the matrix to be formed have a capital shape (FIG. 3) comprising a cylinder ending with the blanking profile 21, and a capital base 22, the machining process can comprise the following operations: the milling of the male part from the whole body under the control of the program tape, leaving an excess of metal for the subsequent grinding of the blanking profile; and the subsequent drilling and boring of the reference holes on the capital, leaving thereat a suitable excess of metal for the grinding and maintaining the piece always blocked in the same position on the worktable of the machine tool. Then, after the hardening, the male part is again positioned with its reference holes engaged by the dowel pins, and then fixed through brackets; thereafter the dowel pins are removed, and the blanking profile and the reference holes are then re-aligned under the control of the program tape. Thus it is clear that this process requires no suppression of the capital of the male part.

What is claimed is:
1. An automatic machining process for blanking dies formed of at least two parts having complementary blanking profiles, the process comprising for each one of said parts the following operations:
   (a) milling said blanking profile and milling a reference profile in said part by means of a milling machine in which the path of the milling tool is continuously controlled by a recorded program;
   (b) heat treating said part so milled;
   (c) positioning said part with respect to the grinding tool of a grinding machine by using said reference profile; and
   (d) grinding said blanking profile by means of said grinding machine in which the path of said grinding tool is continuously controlled by a recorded program.

2. An automatic machining process for blanking dies formed of at least two parts having complementary blanking profiles, the process comprising for each one of said parts the following operations:
   (a) milling said blanking profile and milling a pair of reference holes in said part by means of a machine tool in which the path of the tool is continuously controlled by a recorded program;
   (b) heat treating said part so milled;
   (c) positioning said part with respect to the grinding tool of a grinding machine by engaging said reference holes with dowel pins carried by the worktable of said grinding machine; and
   (d) grinding said blanking profile by means of said grinding machine in which the path of said grinding tool is continuously controlled by a recorded program.

3. An automatic machining process for blanking dies formed of at least two parts having complementary blanking profiles, the process comprising for each one of said parts the following operations:
   (a) milling said blanking profile and milling a reference profile in said part by means of a milling machine in which the path of the milling tool is continuously controlled by a recorder program;
   (b) heat treating said part so milled;
   (c) positioning said part with respect to the grinding tool of a grinding machine by using said reference profile.
   (d) jointly grinding said blanking profile and said reference profile by means of said grinding machine in which the path of said grinding tool is continuously controlled by a recorded program; and
   (e) coupling said two parts by using said reference profiles of both parts.

4. An automatic machining process for blanking dies formed of at least two parts having complementary blanking profiles, and the process comprising for one of said parts the following operations:
 (a) drilling at least two reference holes in said part;
 (b) engaging said reference holes with dowel pins on the worktable of a milling machine;
 (c) milling one of said complementary profiles on a face of said part by means of a milling machine in which the path of the tool is continuously controlled by a first recorded program;
 (d) inverting said part and engaging said reference holes with said dowel pins;
 (e) milling said one of said complementary profiles on the other face of said part by means of said milling machine in which the path of the tool is continuously controlled by said first recorded program, said milling machine being conditioned for interpreting said first recorded program as the program for a mirror image of said complementary profile;
 (f) heat treating said part so milled;
 (g) positioning said part with respect to the grinding tool of a grinding machine by engaging said reference holes with said dowel pins; and
 (h) grinding said complementary profile by means of said grinding machine in which the path of said grinding tool is continuously controlled by a second recorded program.

5. An automatic machining process for blanking dies formed of at least two parts having complementary blanking profiles, the process comprising for each one of said parts the following operations:
 (a) milling said blanking profile and milling a reference profile in said part by means of a milling machine in which the path of the tool is continuously controlled by a recorded program, said milling machine being provided with a first automatic tool radius correction device and with a first compensation factor setting device in which a first value of said compensation factor is set up;
 (b) heat treating said part so milled;
 (c) positioning the part with respect to said grinding tool of a grinding machine by using said reference profile; and
 (d) grinding said blanking profile by means of a grinding machine in which the path of the grinding tool is continuously controlled by said recorded program, said grinding machine being provided with a second automatic tool radius correction device and with a second compensation factor setting device in which a second value of said compensation factor is set up.

References Cited
UNITED STATES PATENTS

| | | | |
|---|---|---|---|
| 3,151,504 | 10/1964 | Pare et al. | 76—107 |
| 3,210,853 | 10/1965 | Wiatt | 51—165 X |
| 3,269,233 | 8/1966 | Lothmann | 90—13 X |

BERNARD STICKNEY, Primary Examiner